(12) United States Patent
Kippley

(10) Patent No.: US 8,638,580 B2
(45) Date of Patent: Jan. 28, 2014

(54) SWITCHING POWER CONVERTERS AND CONTROLLERS HAVING AUXILIARY POWER CIRCUITS

(75) Inventor: Robert H. Kippley, Eagan, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 392 days.

(21) Appl. No.: 12/886,703

(22) Filed: Sep. 21, 2010

(65) Prior Publication Data

US 2012/0069617 A1  Mar. 22, 2012

(51) Int. Cl.
  *H02M 7/155* (2006.01)
(52) U.S. Cl.
  USPC .......................... 363/127; 363/21.04; 363/76
(58) Field of Classification Search
  USPC .................. 363/86, 89, 90, 126, 127, 75, 76
  See application file for complete search history.

(56) References Cited

U.S. PATENT DOCUMENTS

| | | | |
|---|---|---|---|
| 6,060,943 A | 5/2000 | Jansen | |
| 6,111,769 A * | 8/2000 | Zhang et al. | 363/127 |
| 6,256,214 B1 | 7/2001 | Farrington et al. | |
| 7,362,598 B2 * | 4/2008 | Schaible et al. | 363/89 |
| 7,636,011 B2 | 12/2009 | Frederick et al. | |
| 8,189,355 B2 * | 5/2012 | Kyono | 363/70 |
| 2009/0284302 A1 | 11/2009 | Hu et al. | |
| 2009/0284303 A1 | 11/2009 | Hu et al. | |
| 2009/0285001 A1 | 11/2009 | Hu et al. | |

* cited by examiner

*Primary Examiner* — Harry Behm
(74) *Attorney, Agent, or Firm* — Harness, Dickey & Pierce, P.L.C.

(57) ABSTRACT

Switching device controllers, drive circuits, power converters and related methods are disclosed. One example controller for a switching device includes a drive circuit for controlling the switching device and an auxiliary circuit coupled to the drive circuit. The auxiliary circuit includes an input for receiving a waveform having alternating first and second intervals. The auxiliary circuit is configured to energize the drive circuit during the first intervals and de-energize the drive circuit during the second intervals. One example method of energizing and de-energizing a drive circuit for a switching device includes receiving a waveform having alternating first and second intervals, energizing the drive circuit during the first intervals, and de-energizing the drive circuit during the second intervals.

19 Claims, 2 Drawing Sheets

SWITCHING POWER CONVERTERS AND CONTROLLERS HAVING AUXILIARY POWER CIRCUITS

FIELD

The present disclosure relates to switching device controllers and power converters and, more particularly, to switching device controllers and power converters having auxiliary power circuits.

BACKGROUND

This section provides background information related to the present disclosure which is not necessarily prior art.

A wide variety of AC to DC and DC to DC power converters are known. These converters often include one or more switching devices such as synchronous rectifiers for selectively coupling an input voltage or current to an output of the converter. The switching devices can be controlled in a number of different manners. For example, a power converter may employ a self-driven switching device, where a control terminal of the switching device is coupled directly to a secondary winding of a transformer. Alternatively, a power converter may include a switching device and a drive circuit that controls the switching device based on one or more inputs to the drive circuit.

SUMMARY

This section provides a general summary of the disclosure, and is not a comprehensive disclosure of its full scope or all of its features.

According to one aspect of the present disclosure, a method of controlling a drive circuit for a switching device is disclosed. The switching device has a permissible ON time and an expected OFF time. The method includes energizing the drive circuit during the permissible ON time of the switching device, and de-energizing the drive circuit during the expected OFF time of the switching device. The drive circuit is configured to prevent turning ON the switching device when the drive circuit is de-energized.

According to another aspect of this disclosure, a controller for a switching device includes a drive circuit for controlling the switching device and an auxiliary circuit coupled to the drive circuit. The auxiliary circuit includes an input for receiving input power. The auxiliary circuit is configured to energize the drive circuit when the input power has a first polarity and de-energize the drive circuit when the input power has a second polarity. The drive circuit is configured to prevent turning ON the switching device when the drive circuit is de-energized by the auxiliary circuit.

According to yet another aspect of the present disclosure, a power converter includes a first synchronous rectifier, a first drive circuit for controlling the first synchronous rectifier, and an auxiliary circuit coupled to the first drive circuit. The auxiliary circuit has an input for receiving input power and is configured to energize the first drive circuit when the input power has a first polarity and de-energize the first drive circuit when the input power has a second polarity.

Some example embodiments of switching device controllers, drive circuits, power converters and related methods incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
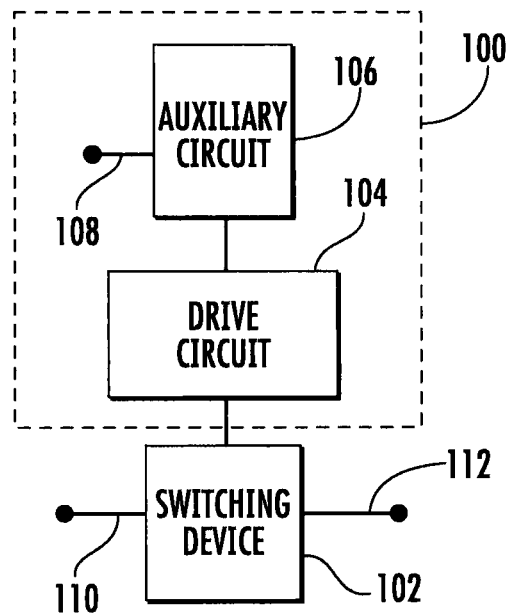
FIG. 1 is a block diagram of a controller and switching device according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

According to one aspect of the present disclosure, a method is provided for controlling a drive circuit for a switching device having a permissible ON time and an expected OFF time. The method includes energizing the drive circuit during the permissible ON time of the switching device, and de-energizing the drive circuit during the expected OFF time of the switching device. Because the drive circuit is de-energized during the expected OFF time of the switching device, the drive circuit does not consume power during the expected OFF time of the switching device. Further, the drive circuit is configured to prevent turning ON the switching device when the drive circuit is de-energized. Therefore, the method can ensure the switching device is OFF (e.g., open) during the expected OFF time of the switching device.

In some embodiments, the method includes receiving an AC power signal having alternating positive and negative intervals. The drive circuit may be energized during the permissible ON time of the switching device by passing the positive intervals of the AC power signal to the drive circuit, and de-energized during the expected OFF time of the switch by blocking the negative intervals of the AC power signal from the drive circuit (or vice versa). The positive intervals of the AC power signal may define the permissible ON time of the switching device, and the negative intervals of the AC power signal may define the expected OFF time of the switching device (or vice versa).

This method can be applied to a wide variety of switching devices including transistor switches in general and synchronous rectifiers (e.g., a transistor and diode connected in parallel) in particular. Suitable synchronous rectifiers ("SRs") include power MOSFETS having intrinsic and/or external body diodes. In some preferred embodiments, the switching device is a synchronous rectifier in an AC-to-DC or DC-to-DC power converter, such as an active power factor correction (PFC) circuit.

The drive circuit can be configured to control the switching device in any suitable manner when the drive circuit is energized. For example, the drive circuit may be configured to control (e.g., turn ON or OFF) the switching device in response to a voltage (e.g., positive or negative) across the switching device (e.g., to emulate a diode function) when the drive circuit is energized.

Some example switching device controllers and power converters capable of performing this method will now be described with reference to FIGS. 1-3. It should be understood, however, that the method described above is not limited to the particular example circuits described below, and the particular example circuits described below can be used to perform other methods.

FIG. 1 illustrates a controller 100 for a switching device 102 according to one example embodiment of the present disclosure. As shown in FIG. 1, the controller 100 includes a drive circuit 104 for controlling the switching device 102 and an auxiliary circuit 106 coupled to the drive circuit 104. The auxiliary circuit 106 includes an input 108 for receiving input power. The auxiliary circuit 106 is configured to energize the drive circuit 104 when the input power has a first polarity and de-energize the drive circuit 104 when the input power has a second polarity.

The power source coupled to the input 108 may be an AC or DC power source. Further, the first polarity or the second polarity can be defined to include no polarity (e.g., zero volts). Thus, the auxiliary circuit 106 may be configured, for example, to energize the drive circuit 104 when the power source coupled to the input 108 has a positive voltage and de-energize the drive circuit 104 when the power source coupled to the input 108 has a negative voltage (or zero voltage).

The auxiliary circuit 106 may be configured to energize and de-energize the drive circuit 104 in a variety of ways. In some embodiments, the auxiliary circuit includes one or more rectifiers (e.g. diodes, etc.) to pass positive input voltages to energize the drive circuit 104 and block negative input voltages to de-energize the drive circuit 104.

The drive circuit may be configured to prevent turning ON the switching device when the drive circuit is de-energized. For example, if the drive circuit 104 does not include any storage capacitors, there should be no voltage present in the drive circuit 104 to turn ON the switching device 102 (i.e., if the switching device 102 is a normally open switching device) when the drive circuit 104 is not receiving power from the auxiliary circuit 106.

The drive circuit 104 can be configured in various ways to control the switching device 102 (when the drive circuit 104 is energized) as desired for any given application of these teachings. In some embodiments, the drive circuit 104 is configured to control the switching device 102 in response to a voltage across the switching device 102, and to allow current flow in only one direction through the switching device 102, to emulate a diode function. For example, when a voltage across terminals 110 and 112 is positive, the drive circuit 104 can turn ON the switching device 102 to permit current flow from terminal 110 to terminal 112. When the voltage across terminals 110, 112 is negative (or about zero volts), the drive circuit 104 can turn OFF the switching device 102 to inhibit current flow from terminal 112 to terminal 110. Alternatively, the drive circuit can be configured to control the switching device 102 (when the drive circuit 104 is energized) in any other desired manner.

The controller 100 and switching device 102 shown in FIG. 1 can be utilized in a wide variety of isolated and non-isolated power converters applications (e.g., active PFC circuits, AC-to-DC converters, DC-to-DC converters, etc.), and in lieu of virtually any self-driven or control-driven synchronous rectifier. For example, the controller 100 and switching device 102 shown in FIG. 1 can be used as a synchronous rectifier to replace a diode in an AC input bridge rectifier. In these (and other) applications, the drive circuit 104 may have additional inputs coupled to terminals 110, 112, and can be configured to operate the switching device 102 in a manner that emulates a diode function. In addition, the AC input power may be coupled to the input 108 of the auxiliary circuit 106, and the auxiliary circuit 106 may include one or more rectifiers (e.g., diodes).

Figure 2:
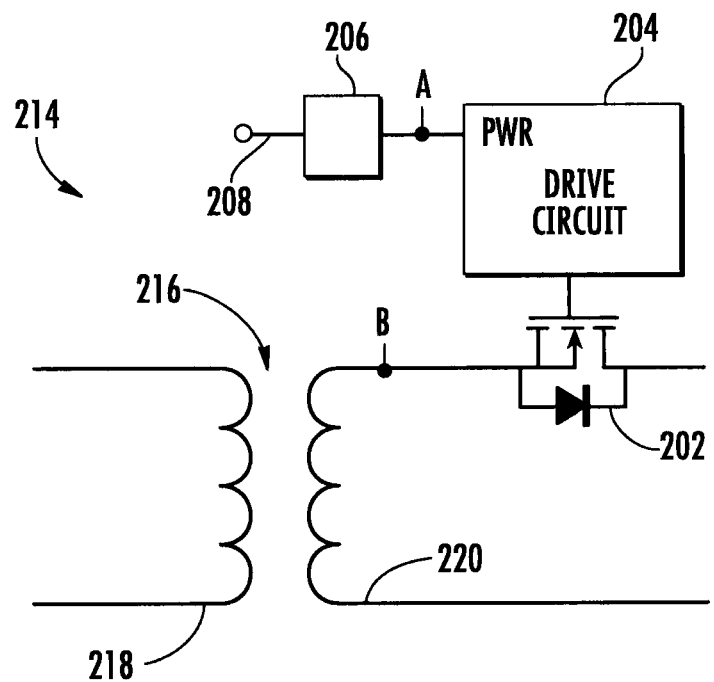
FIG. 2 is a circuit diagram of a power converter employing a controller and switching device of the type shown in FIG. 1 according to another example embodiment of the present disclosure.

FIG. 2 illustrates a power converter 214 according to another example embodiment. The power converter 214 includes a transformer 216 having a primary winding 218 and a secondary winding 220. The power converter 214 further includes a synchronous rectifier 202, a drive circuit 204 for controlling the synchronous rectifier 202, and an auxiliary circuit 206 coupled to the drive circuit 204. The auxiliary circuit 206 has an input 208 for receiving input power. The auxiliary circuit 206 is configured to energize the drive circuit 204 when the input power has a first polarity (e.g., a positive voltage) and de-energize the drive circuit 204 when the input power has a second polarity (e.g., a negative or zero voltage).

Suitable drive circuits for use in FIGS. 1-2 include, without limitation, those disclosed in U.S. Pat. No. 7,636,011 titled Controller for ORing Field Effect Transistor and U.S. application Ser. No. 12/121,997 filed May 16, 2008 titled Control Circuit and Methods for Controlling Switching Devices, the entire disclosures of which are incorporated herein by reference. It should be understood that the ORing FET drive circuits disclosed in such patent and application, and other ORing FET drives circuits, can be used as drive circuits 104, 204 in FIGS. 1-2 (e.g., with the drive circuit's bias input coupled to auxiliary circuit 106 or 206).

The input 208 of the auxiliary circuit 206 may be coupled to any suitable power source. In some embodiments, the input 208 is coupled to the transformer 216 for receiving AC power from the transformer 216. For example, the input 208 may be coupled to the primary winding 218, the secondary winding 220, or another winding (not shown) of the transformer 216. If the input 208 is coupled to the primary winding 218, appropriate measures may be needed to reduce the input voltage or otherwise ensure the input voltage does not exceed the ratings of components used in the auxiliary circuit 206. Alternatively, an auxiliary primary or secondary winding (e.g, having a lower voltage level than the main primary or secondary winding) can be employed to power the auxiliary circuit 206.

Alternatively, the input 208 may be coupled to another input power source such as, for example, an integrated circuit control pin. It should also be understood that the synchronous rectifier 202, drive circuit 204, and auxiliary circuit 206 of FIG. 2 can be employed in a variety of other power converter designs, with and without transformers, without departing from the scope of this disclosure. In some embodiments, the auxiliary circuit 206 includes one or more rectifiers (e.g., diodes, etc.).

Although FIG. 2 illustrates only one SR 202 on the secondary side of the transformer 216, a second SR (e.g., a "freewheeling" SR) and associated drive circuit may also be employed. In that event, the auxiliary circuit 206 may be configured to de-energize the drive circuit for the second SR when the input power has the first polarity (e.g., a positive voltage), and energize the drive circuit for the second SR when the input power has the second polarity (e.g., a negative or near zero voltage).

Figure 3:
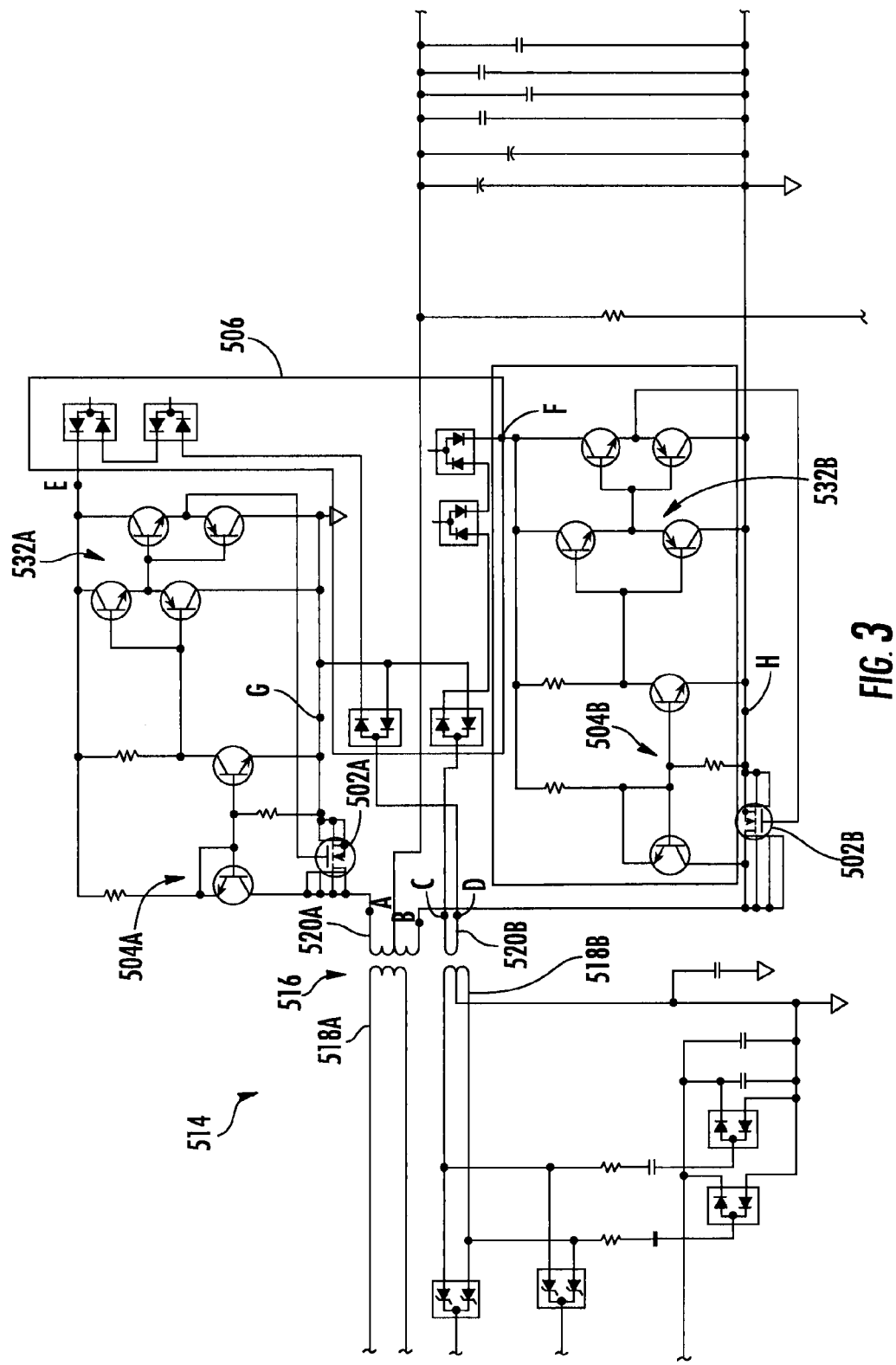
FIG. 3 is a circuit diagram of an isolated power converter with synchronous rectifiers according to still another example embodiment of this disclosure.

FIG. 3 illustrates a power converter 514 according to another example embodiment of the present disclosure. The power converter 514 includes a transformer 516 having a main primary winding 518A, an auxiliary primary winding 518B, a main secondary winding 520A, and an auxiliary secondary winding 520B. The main secondary winding 520A is coupled to synchronous rectifiers 502A, 502B. As shown in FIG. 3, the power converter 514 includes a drive circuit 504A for controlling the synchronous rectifier 502A and a drive circuit 504B for controlling the synchronous rectifier 502B. The power converter 514 also includes auxiliary circuit 506 connected to the auxiliary secondary winding 520B, which is coupled to the auxiliary primary winding 518B.

In this example embodiment, the auxiliary circuit 506 includes several diodes for rectifying the AC waveform provided by the auxiliary secondary winding 520B. Specifically, the auxiliary circuit 506 includes six diodes connected between one terminal of the auxiliary secondary winding 520B and an input node E to drive circuit 504A, and six diodes connected between the other terminal of the auxiliary secondary winding 520B and an input node F to the drive circuit 504B. As should be apparent, the auxiliary circuit may include more or less diodes (or no diodes) in other embodiments.

During operation of the power converter 514, an AC waveform is produced across the main and auxiliary secondary windings 520A, 520B. During the positive intervals, the auxiliary circuit 506 passes the AC waveform to drive circuit 504B to energize drive circuit 504B during the positive intervals. When drive circuit 504B is energized, the voltage at node B is less than the voltage at node H. As a result, the drive circuit 504B turns ON the synchronous rectifier 502B during the positive intervals. At the same time, the auxiliary circuit 506 blocks the AC waveform from drive circuit 504A so that drive circuit 504A is de-energized (or not energized in the first instance) during the positive intervals. When drive circuit 504A is not energized, the voltage at node A is greater than the voltage at node G, and synchronous rectifier 502A is OFF.

Conversely, during the negative intervals, the auxiliary circuit 506 passes the AC waveform to drive circuit 504A to energize drive circuit 504A during the negative intervals. When drive circuit 504A is energized, the voltage at node A is less than the voltage at node G. As a result, the drive circuit 504A turns ON the synchronous rectifier 502A during the negative intervals. At the same time, the auxiliary circuit 506 blocks the AC waveform from drive circuit 504B so that drive circuit 504B is de-energized (or not energized in the first instance) during the negative intervals. When drive circuit 504B is not energized, the voltage at node B is greater than the voltage at node H, and synchronous rectifier 502B is OFF.

As apparent from the description above, drive circuit 504A is energized only during the permissible ON time of synchronous rectifier 502A (i.e., the negative intervals), and is de-energized during the expected OFF time of synchronous rectifier 502A (i.e., the positive intervals). Further, drive circuit 504A is configured to prevent turning ON synchronous rectifier 502A when drive circuit 504A is de-energized (e.g, by ensuring there is no voltage present to accidentally hold or turn ON the synchronous rectifier 502A when power is removed from drive circuit 504A). In this manner, the drive circuit 504A prevents reverse current flow through synchronous rectifier 502A during the expected OFF time of synchronous rectifier 502A. Similarly, drive circuit 504B is energized only during the permissible ON time of synchronous rectifier 502B (i.e., the positive intervals), and is de-energized during the expected OFF time of synchronous rectifier 502B (i.e., the negative intervals). Further, drive circuit 504B is configured to prevent turning ON synchronous rectifier 502B when drive circuit 504B is de-energized (e.g, by ensuring there is no voltage present to accidentally hold or turn ON the synchronous rectifier 502B when power is removed from drive circuit 504B). In this manner, the drive circuit 504B prevents reverse current flow through synchronous rectifier 502B during the expected OFF time of synchronous rectifier 502B.

Because drive circuits 504A, 504B shown in FIG. 3 are energized only during the permissible ON times of synchronous rectifiers 502A, 502B, components for generating and maintaining a stand-by voltage (e.g., bypass storage capacitors, Baker clamps, etc.) are not required.

Additionally, drive circuits 504A, 504B include totem pole circuits 532A, 532B, respectively, which are operable to adjust the turn ON and/or OFF times of the synchronous rectifiers 502A, 502B. In the example embodiment of FIG. 3, the totem pole circuits 532A, 532B each include two sets of transistor pairs connected in a totem pole arrangement.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A power converter comprising:
    a first synchronous rectifier;
    a first drive circuit for controlling the first synchronous rectifier, the first drive circuit having a bias input and one or more transistors coupled to the bias input; and
    an auxiliary circuit coupled to the first drive circuit, the auxiliary circuit having an input for receiving input power;
    the auxiliary circuit configured to energize the first drive circuit when the input power has a first polarity and remove power from the first drive circuit including the one or more transistors when the input power has a second polarity so the first drive circuit including the one or more transistors does not consume power when the input power has the second polarity.

2. The power converter of claim 1 further comprising a transformer, wherein the input of the auxiliary circuit is coupled to the transformer for receiving AC power from the transformer.

3. The power converter of claim 2 further comprising a second synchronous rectifier and a second drive circuit for controlling the second synchronous rectifier, the second drive circuit having a bias input and one or more transistors coupled to its bias input, wherein the auxiliary circuit is configured to remove power from the second drive circuit including its one or more transistors when the input power has the first polarity and energize the second drive circuit when the input power has the second polarity.

4. The power converter of claim 3 wherein the transformer includes a primary side and a secondary side, and wherein the first and second synchronous rectifiers are coupled to the secondary side of the transformer.

5. The power converter of claim 4 wherein the input of the auxiliary circuit is coupled to the secondary side of the transformer.

6. A controller for a switching device, the controller comprising a drive circuit for controlling the switching device and an auxiliary circuit coupled to the drive circuit, the drive circuit including a bias input and one or more transistors coupled to the bias input, the auxiliary circuit including an input for receiving input power, the auxiliary circuit configured to energize the drive circuit when the input power has a first polarity and remove power from the drive circuit including the one or more transistors when the input power has a second polarity so the drive circuit including the one or more transistors does not consume power when the input power has the second polarity, the drive circuit configured to prevent turning ON the switching device when the drive circuit is de-energized by the auxiliary circuit.

7. The controller of claim 6 wherein the switching device is a synchronous rectifier.

8. The controller of claim 7 wherein the drive circuit is configured to control the switching device in response to a voltage across the switching device when the drive circuit is energized by the auxiliary circuit.

9. The controller of claim 8 wherein the drive circuit is configured to allow current flow in only one direction through the switching device when the drive circuit is energized by the auxiliary circuit.

10. The controller of claim 9 wherein the drive circuit includes at least two sets of transistor pairs connected in a totem pole arrangement.

11. The controller of claim 10 wherein the auxiliary circuit comprises at least one rectifier.

12. The controller of claim 11 wherein said at least one rectifier includes a diode.

13. A method of controlling a drive circuit for a switching device, the drive circuit having a bias input and one or more transistors coupled to the bias input, the switching device having a permissible ON time and an expected OFF time, the method comprising:
    energizing the drive circuit during the permissible ON time of the switching device; and
    removing power from the drive circuit including the one or more transistors during the expected OFF time of the switching device so the drive circuit including the one or more transistors does not consume power during the expected OFF time of the switching device,
    wherein the drive circuit is configured to prevent turning ON the switching device when the drive circuit is de-energized.

14. The method of claim 13 wherein the switching device is a synchronous rectifier.

15. The method of claim 14 further comprising receiving an AC power signal having alternating positive and negative intervals, wherein energizing includes passing the positive intervals to the drive circuit to energize the drive circuit during the positive intervals, and wherein de-energizing includes blocking the negative intervals from the drive circuit to de-energize the drive circuit including the one or more transistors during the negative intervals.

16. The method of claim 15 wherein the positive intervals define the permissible ON time of the switching device and the negative intervals define the expected OFF time of the switching device.

17. The method of claim 15 wherein the synchronous rectifier is comprised in an active power factor correction circuit.

18. The method of claim 15 wherein the synchronous rectifier is comprised in an AC-to-DC or DC-to-DC power converter.

19. The method of claim 15 wherein the synchronous rectifier is comprised in a bridge rectifier.

* * * * *